Patented Jan. 2, 1945

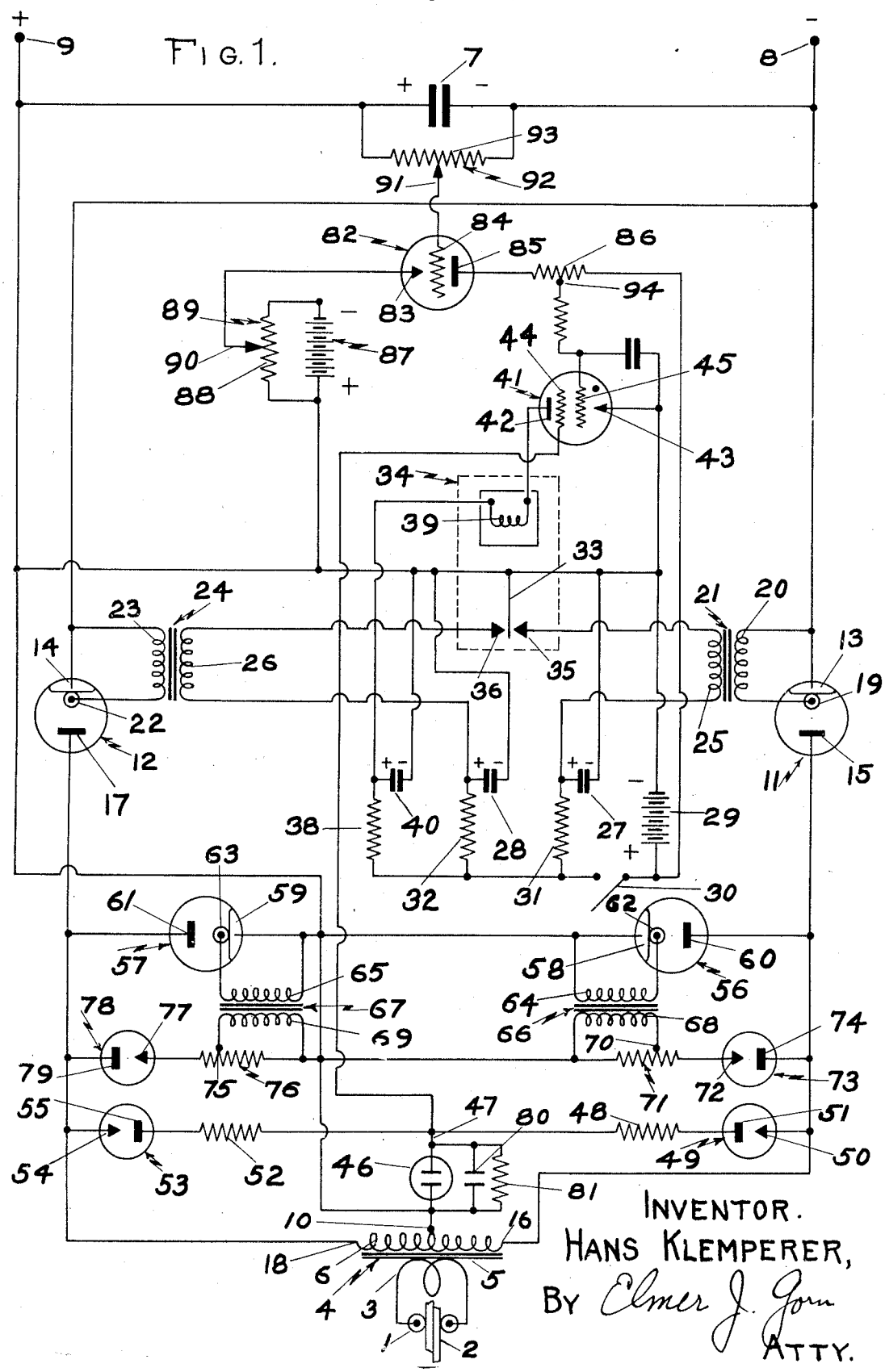

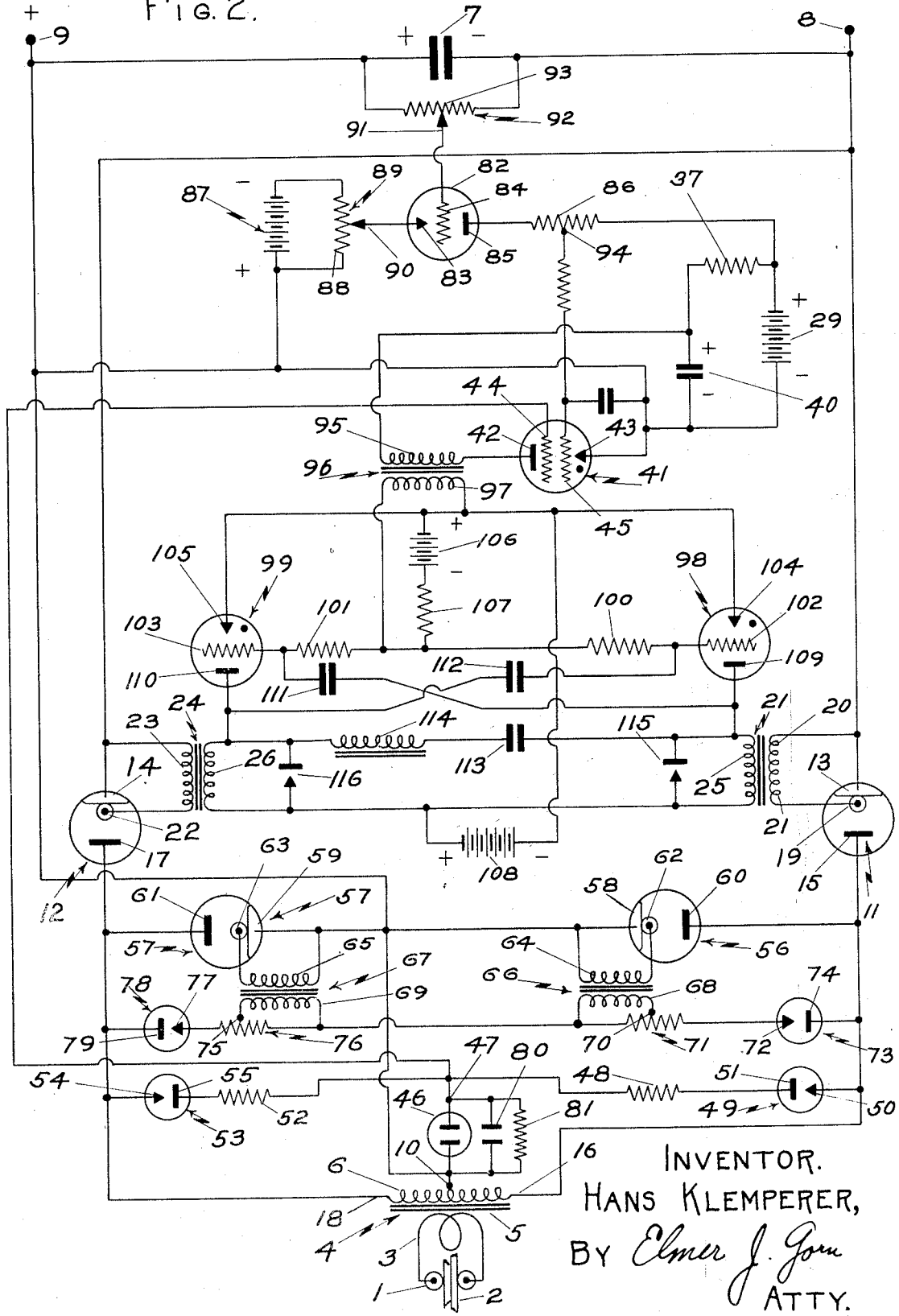

2,366,197

UNITED STATES PATENT OFFICE 2,366,197

ELECTRICAL CONTROL SYSTEM

Hans Klemperer, Belmont, Mass., assignor to Raytheon Manufacturing Company, Newton, Mass., a corporation of Delaware Application April 22, 1942, Serial No. 440,019

6 Claims. (Cl. 171—119)

This invention relates to electrical systems of type which are adapted to supply intermittent pulses of current by the successive discharge of one or more condensers. More particularly, this invention refers to condenser welding systems.

In certain condenser welding systems it is desirable that the pulses of welding energy follow each other as rapidly as possible. However, there are limitations as to the speed with which successive welding pulses may be made due to the necessity of preventing overlapping of pulses, and to the further necessity of allowing a sufficient interval to permit the electrical energy storage means, such as for example, condensers, to store an adequate amount of electrical energy before discharging the energy therefrom. It has been customary heretofore after the condenser has been discharged into the load to allow a given amount of time to elapse before the condenser is again discharged. In order to insure against overlapping of impulses and in order to allow the condenser to be fully charged, said time intervals have been made comparatively long. In allowing a sufficient margin of safety so that these conditions may be met, these intervals have been made so long that the speed of operation of such systems has been reduced. It is an object of this invention to provide a system which may be operated at the maximum possible speed, the condenser being discharged immediately upon the decay of a previously supplied pulse and upon the charging of the condenser to a predetermined level.

Another object of the present invention is the provision of means for preventing the discharge of a condenser in such a system until said condenser has been fully charged.

Other and further objects of this system will become apparent, and the foregoing objects will be best understood, from the following description of exemplification thereof reference being had to the drawings in which Fig. 1 is a schematic diagram of a seam welding system embodying my invention; and Fig. 2 is a schematic diagram of another seam welding system representing a modified embodiment of my invention.

In Fig. 1, welding current is to be supplied to a pair of rotatable welding electrodes or wheels 1 adapted to roll on the work 2 which is to be welded. The current is to be supplied to the electrodes in successive pulses of welding current so as to perform successive welding operations. Each welding operation welds a spot on the work 2, these spots preferably overlapping so as to form a continuous seam welding. The electrodes 1 are connected to the secondary 3 of a welding transformer 4. This welding transformer is provided with a core member 5 made of magnetic material. The welding transformer 4 is also provided with a tapped primary winding 6 adapted to be energized by the discharge from a relatively large condenser 7. Condenser 7 is adapted to be charged from any suitable source of direct current such as a direct current generator, battery, rectifier or the like. For this purpose, the condenser may have its positive side connected to a terminal 9 and its negative side connected to a terminal 8, terminals 9 and 8 being adapted to be connected to the positive and negative sides, respectively, of a suitable source of direct current.

Condenser 7 is designed to be discharged alternately and in opposite vectorial directions through the halves of the primary 6 of the welding transformer 4. For this purpose the positive side of condenser 7 is connected directly to the tap 10 of the primary winding 6. The negative side of condenser 7 is connected to opposite ends of the primary winding 6 by separate controlled ignition discharge tubes 11 and 12. These tubes are preferably of the pool cathode type and are each provided with an igniter for initiating a cathode spot on the pool in order to cause said tubes to conduct current. This igniter may be of the electrostatic type consisting of a conductor separated and insulated from the cathode by a thin glass layer. Tubes 11 and 12 are provided with cathodes 13 and 14, respectively, said cathodes being connected to the negative side of condenser 7. Anode 15 of tube 11 is connected to end 16 of the primary winding 6 while anode 17 of tube 12 is connected to end 18 of primary winding 6. Igniting impulses are supplied to the igniter 19 of tube 11 from the secondary 20 of the igniting transformer 21. Similarly, igniter 22 is supplied with igniting impulses by being connected to the secondary 23 of an igniting transformer 24. Igniting transformers 21 and 24 are provided with primary windings 25 and 26, respectively.

Igniting impulses are supplied to the primaries 25 and 26 by condensers 27 and 28, respectively. Condensers 27 and 28 may be charged from any suitable source of direct current, such as for example, a battery 29 which has its negative end directly connected to the negative sides of condensers 27 and 28. The positive side of said battery may be connected to said condensers through a manually-operable switch 30 in series with both said condensers and separate resistances 31 and 32 in series with condensers 27 and 28, respectively. Resistances 31 and 32 limit the current supplied to said condenser and control the charging rate.

In supplying igniting impulses to the primary 25, condenser 27 has its positive side directly connected to one end of said primary, the negative side of said condenser being connected to the connecting arm 33 of a ratchet relay 34, said arm 33 being adapted to make contact with either of two contacts 35 or 36 in said relay. Contact 35 is connected to the other end of the primary winding 25. Similarly, condenser 28 has its positive side directly connected to one end of primary winding 26 and its negative side connected to arm 33. Contact 36 is in turn connected to the other end of primary winding 26. It will be seen that when arm 33 makes contact with contact 35 condenser 27 will be discharged through primary winding 25 whereas if arm 33 makes contact with contact 36, condenser 28 will be discharged through primary winding 26. Thus, as arm 33 connects with contact 35 or 36, it supplies igniting impulses to tubes 11 or 12, respectively.

The movement of arm 33 between contacts 35 and 36 is determined in the relay herein described by current supplied to the coil 39 of said relay and associated mechanism. The relay 34 is of the type in which the movement of arm 33 from contact to contact is produced by succeeding pulses of current supplied to the coil 39 thereof, each pulse of current moving the arm away from one contact and to the other, the next pulse of current moving the arm from said other contact back to the first contact, etc. Thus, by supplying a succession of pulses of current to coil 39 arm 33 alternately makes contact with contacts 35 and 36 and thereby alternately discharges condensers 27 and 28 to thereby ignite tubes 11 and 12 alternately, thus discharging condenser 7 alternately and in opposite vectorial directions through the halves of primary winding 6.

Pulses of current for actuating relay 34 may be supplied to the coil 39 of said relay from any suitable source, such as for example a condenser 40. Condenser 40 may be charged by said battery 29 in series with a current limiting resistance 38. Condensers 40 has its positive side directly connected to one end of coil 39 by a gaseous rectifying tube 41, said gaseous rectifying tube being controlled to control the discharge of condenser 40 through the coil 39 of relay 34. Tube 41 has its anode 42 connected to one end of the coil 39 and its cathode 43, which may be of the permanently energized type, such as a filamentary cathode, connected to the negative side of condenser 40. Tube 41 is preferably provided with two control grids 44 and 45.

It will be seen that whenever tube 41 conducts, ratchet relay 34 will be operated and will cause either tube 11 or tube 12 to fire to thereby produce a pulse of welding current through the primary 6 of the welding transformer 4. As stated hereinbefore, it is an object of this invention to produce succeeding welding pulses as rapidly as possible. Thus, tube 41 is designed to conduct and to cause arm 33 of ratchet relay 34 to move from contact to contact as soon as any previously supplied pulse of current in the primary winding 6 has completely decayed, and the condenser 7 has been fully charged. Therefore, means are provided in this system for preventing conduction of tube 41 when any pulse of current is passing through primary winding 6 and when condenser 7 is not fully charged.

For preventing conduction of tube 41 when any pulse of current is passing through primary winding 6, I preferer to utilize means, such as those described in my copending application, Serial No. 435,979, filed March 24, 1942 for Electrical control system. Such means are preferably responsive to the flow of current in the primary winding 6 of the welding transformer 4 and are adapted to derive a potential therefrom to produce a negative bias on grid 44 of tube 41. Tube 41 is so designed that the application of a suitable negative bias to either grid 44 thereof or to grid 45 will prevent said tube from conducting. In order to derive a potential from the pulse of current supplied to primary winding 6, I prefer to provide a circuit including an impedance arranged in shunt across each half of the primary winding, the potential drop produced across said impedance providing the cut-off bias for grid 44 of tube 41. For this purpose, I prefer to utilize a constant voltage device such as a glow discharge device 46. One side of the glow discharge device 46 is connected directly to tap 10 of primary winding 6. The other end 47 of said glow discharge device 46 is connected in series with a current limiting resistance 48 and a rectifying tube 49 to end 16 of primary winding 6. The rectifying tube 49 may be a gaseous tube having a cathode of the permanently energized type. The cathode 50 of tube 49 is connected to end 16 of primary winding 6, and the anode 51 of said tube is connected to resistance 48. Similarly, the glow discharge tube 46 is connected across the left side of primary winding 6 by connecting side 47 thereof through a resistance 52 and a rectifying tube 53 to end 18 of primary winding 6. Tube 53 may be similar to tube 49 and may be provided with a permanently energized cathode 54 which is connected to end 18, and with an anode 55 connected to resistance 52. Side 47 of glow discharge tube 46 is connected to the grid 44 of tube 41. Since the cathode 43 of tube 41 is connected to the center tap 10 of primary winding 6, it will be seen that when a difference of potential is produced across said glow discharge tube 46, this potential will be impressed between grid 44 and cathode 43.

The drop in potential across glow discharge tube 46 is produced whenever current flows through either half of the primary winding 6 as will be apparent from the following. If, for example, tube 11 fires, condenser 7 will discharge into the right side of primary winding 6. A potential drop will be produced across said primary winding upon the firing of tube 11 with end 16 of said winding being negative relative to center tap 10. The potential across the right side of primary winding 6 will be impressed across the shunt circuit arranged thereacross comprising tube 49, resistance 48 and glow discharge tube 46. Since this potential will be in the correct vectorial direction with negative potential on the cathode of tube 49 and positive potential on the anode thereof, tube 49 and glow discharge tube 46 will both fire. A voltage drop will be produced across the glow discharge tube 46 with side 47 thereof being negative relative to the potential on the center tap 10. This voltage drop will be impressed on tube 41 between its grid 44 and its cathode 43 and will thereby prevent said tube from conducting. Similarly, when tube 12 is fired and a pulse of current flows through the left side of primary winding 6, the shunt circuit consisting of rectifying tube 53, resistance 52 and glow discharge tube 46 will conduct current and thereby produce a drop in potential across the glow discharge tube 46 which drop of potential is impressed between grid 44 and cathode 43 and serves to prevent tube 41 from conducting.

Because of the inductance associated with the welding load, the discharge of condenser 7 through either half of the primary winding 6 tends to be oscillatory and the potential across both halves of said winding tends to reverse as the condenser 7 discharges therethrough. In order to make each welding current impulse substantially unidirectional with exponential decay, a pair of controlled ignition discharge tubes 56 and 57, preferably of the same type as tubes 11 and 12, is provided. Tubes 56 and 57 have their cathodes 58 and 59, respectively, connected together and to tap 10 on the primary winding 6. Anode 60 of tube 56 is connected to end 16 of the primary winding 6, while anode 61 of tube 57 is connected to end 18 of the primary winding. Tubes 56 and 57 are provided with igniters 62 and 63, respectively, preferably of the type heretofore described in connection with tubes 11 and 12. These igniters are supplied with igniting impulses from the secondary windings 64 and 65 of igniting transformers 66 and 67, respectively. Primaries 68 and 69 of igniting transformers 66 and 67 are adapted to have igniting impulses supplied thereto. For this purpose one end of each of said primaries are connected together and to top 10 of the primary winding 6 of the welding transformer. The other end of primary winding 68 is connected to a tap 70 on a resistance 71. One end of resistance 71 is connected to tap 10 of the primary winding 6, the other end of said resistance being connected to the cathode 72 of a rectifying tube 73 having its anode 74 connected to end 16 of the primary winding 6. Tube 73 may be a gas filled rectifying tube having a permanently energized cathode. Similarly the other end of the primary 69 of igniting transformer 67 is connected to a tap 75 on a resistance 76, one end of resistance 76 being connected to the tap 10 of primary winding 6 while the other end of resistance 76 is connected to the cathode 77 of a rectifying tube 78 which has its anode 79 connected to end 18 of the primary winding 6. Rectifying tube 78 is preferably of the gaseous type provided with a permanently energized cathode. When the potential across either side of said primary winding 6 reverses, the gaseous rectifying tube 73 or 78 associated with said side will conduct current and a voltage drop will be produced in the resistance 71 or 76 in series with said tube to thereby supply an igniting impulse to the igniting transformer 66 or 67. These igniting impulses will cause either tube 56 or tube 57 to fire thereby providing for the exponential unidirectional decay of current through the associated half of the primary winding 6.

It will be seen that, when the potential in either half of the primary winding is reversing and the potential across said winding is zero, neither tube 49 nor tube 53 will be conducting and no potential drop will be produced across glow discharge tube 46 for maintaining a cut-off bias on tube 41. In order to maintain this cut-off bias during the extremely short interval in which both tube 49 and tube 53 are not conducting, I prefer to provide a condenser 80 across said glow discharge tube 46, said condenser being charged during the time current is flowing through the glow discharge tube 46, said condenser maintaining a cut-off bias when current is no longer flowing therethrough. A resistance 81 is provided across condenser 80 to discharge said condenser so that the condenser maintains the cut-off bias on tube 41 for only a short time during the reversal of potential across either of the halves of the primary winding 6.

From the foregoing description it will be seen that when tube 11 is ignited and condenser 7 discharges through the right side of primary winding 6, tube 49 conducts and a voltage drop is impressed upon tube 41 and prevents operation thereof. The potential in the right side of primary winding 6 declines to zero and tube 49 as well as glow discharge tube 46 ceases to conduct. The cut-off bias will be maintained on tube 41 by condenser 80 until the potential across the right side of primary winding 6 reverses. When this potential across the right side of primary winding 6 reverses a potential will be induced in the left side of primary 6 in a vectorial direction which will cause tube 53 to conduct and tube 46 will also then conduct, a constant voltage drop being produced across glow discharge tube 46 which will be impressed upon tube 41 and prevent conduction in said tube. A similar operation occurs when tube 12 is ignited with tube 53 first conducting, and after the potential across the left side of primary winding 6 has reversed, tube 49 then conducting. From the foregoing it will be seen that whenever a pulse of current is flowing through either half of the primary winding 6 of the welding transformer 4, a cut-off bias will be applied to tube 41 to thereby prevent said tube from conducting and operating ratchet relay 34.

I have hereinabove described how tube 41, which upon conduction operates the ratchet relay 34 to fire either tube 11 or 12, is prevented from conducting whenever a pulse of current is flowing in the primary 6. In accordance with my invention tube 41 is also prevented from conducting until condenser 7 is charged to a predetermined level. Charging of the condenser to a predetermined level before discharge thereof is essential in many condenser systems, particularly in condenser welding systems where discharge of the condenser before it is fully charged will produce non-uniform and inadequate welds. It is therefore essential in such systems that the condenser be fully charged before being discharged. In the systems illustrated in the drawings, this is accomplished by preventing tube 41 from conducting and thereby discharging condenser 7 until condenser 7 has been charged to a predetermined level.

To prevent tube 41 from firing, I prefer to apply a cut-off bias potential to the first grid 45 of tube 41 as long as condenser 7 is undercharged. To control the application of this cut-off bias, I prefer to provide a tube 82 which is preferably of the vacuum type having a permanently energized cathode 83 and a control grid 84. Tube 82 has its anode 85 connected through a suitable tapped resistance 86 to the positive side of battery 29. The cathode 83 of tube 82 is connected to the negative side of battery 29 and to the positive side of condenser 7 through a source of reference potential, the reference potential being derived from a source of direct current such as a battery 87 having the resistance 88 of the potentiometer 89 connected thereacross, the positive side of said battery being directly connected to the negative side of battery 29 and the positive side of condenser 7. The arm 90 of potentiometer 89 is connected to the cathode 83. Grid 84 is connected to the arm 91 of the potentiometer 92 having its resistance 93 connected across condenser 7. Tap 94 of resistance 86 is connected in series with a suitable grid-resistor to the grid 45 of tube 41. This circuit, which is adapted to prevent conduction in tube 41 when condenser 7 is undercharged, operates in the following manner. It will be seen that battery 87 applied a positive bias to the grid 45 which is in series with the bias supplied to the charge on condenser 7 and is vectorially opposite thereto. When condenser 7 is undercharged the constants of the circuits are such, (and these may be adjusted by varying potentiometers 89 and 92), that positive potential is applied to the grid 84, this potential being sufficient to cause tube 82 to conduct. When tube 82 conducts a voltage drop is produced across resistance 86, this voltage drop being in a direction to produce negative cut-off bias on tube 41 to thereby prevent said tube from conducting. As condenser 7 is charged, the potential derived from said condenser through potentiometer 92 increases until it exceeds the potential derived from battery 87 and thereby applies a negative bias to grid 84 of tube 82. When condenser 7 is fully charged this negative bias is of a sufficient magnitude to cut off conduction in said tube. Grid 45 of tube 41 thereupon becomes positive and tube 41 will conduct, providing grid 44 is also positive, this last depending upon whether any pulse of current is still alive in the primary winding 6 of the welding transformer 4.

From the foregoing description it will be seen that I have invented a condenser discharge system which is adapted to operate at a high rate of speed, limited solely by time required to charge the condenser of such systems and the time required for pulses of energy, delivered by said condenser, to decay. In the system described in connection with Fig. 1, I have described tube 41 as controlling the operation of a ratchet relay and thereby controlling the ignition of the ignition discharge tubes. However, instead of a ratchet relay other firing controls may be employed. In Fig. 2 a novel means for firing the ignition discharge tubes is illustrated.

Referring now to Fig. 2, the same numerals used in Fig. 1 have been applied to elements thereof which are the same as, and which function in a manner similar to, like-numbered parts in Fig. 1. In Fig. 2 the pulses of current derived from tube 41 are applied to the primary 95 of a transformer 96 instead of to the coil 39 of ratchet relay 34 as described in Fig. 1. The pulses appearing in the secondary 97 of the transformer 96 are used to alternately initiate conduction in a pair of gaseous rectifying tubes 98 and 99. For this purpose one end of the secondary 97 is connected separately in series with resistances 100 and 101 to the grids 102 and 103 of tubes 98 and 99, respectively. The other end of said secondary 97 is connected to the cathodes 104 and 105 of tubes 98 and 99, respectively. Cathodes 104 and 105 may be of the permanently energized type. In order to hold off conduction in tubes 98 and 99 until pulses are applied to said tubes from the secondary 97, a suitable source of direct current 106, such as for example a battery, may be used to apply a negative bias to the grids of tubes 98 and 99. The battery 106 has the positive side thereof connected to the cathodes of said tubes and the negative side thereof connected in series with a resistance 107 to a point intermediate resistances 100 and 101 and through said last-mentioned resistances to the grids 102 and 103, respectively.

Upon the firing impulse of either tube 98 or tube 99 an igniting impulse is adapted to be delivered to the primary 25 and 26 of igniting transformers 21 or 24, respectively. To provide anode potential for said tubes a source of direct current 108, such as for example a battery, may be employed. The battery 108 has its negative side connected to the cathodes 104 and 105. The positive side of battery 108 is connected to one end of each of the primaries 25 and 26 of the igniting transformers 21 and 24, respectively, the other ends of said primaries being connected to the anodes 109 and 110, respectively. It will be seen that when either tube 98 or tube 99 conducts, the igniting transformer having its primary in series with said tube will receive an igniting impulse.

In the system illustrated in Fig. 1, each time tube 41 conducts, a pulse of energy is supplied to one of the igniting transformers, these pulses of energy being impressed alternately on the primaries 25 and 26. In Fig. 2, in order to alternately supply igniting transformers 21 and 24 with igniting impulses, tubes 98 and 99 are adapted to conduct alternately. To cause said tubes to conduct alternately, I prefer to arrange a pair of condensers 111 and 112 in the following manner. Condenser 111 is connected to anode 109 of tube 98 and to grid 103 of tube 99. Similarly, condenser 112 is connected to anode 110 of tube 99 and to grid 102 of tube 98. A relatively large condenser 113 in series with a choke coil 114 is connected between anode 109 and anode 110. A rectifier 115 is connected across primary 25 of igniting transformer 21 and a similar rectifier 116 is connected across primary winding 26 of igniting transformer 24.

When the firing arrangement is assembled, condensers 112 and 113 are charged by battery 108, the sides of said condensers connected to the grids being negative. While battery 106 tends to charge said condensers in an opposite vectorial direction, said battery is much smaller than 108 and therefore a substantial charge in the direction first indicated will be produced by battery 108.

Thereafter, when tube 41 conducts and a pulse of current is thereby produced in the secondary 97 of transformer 96, this pulse of current applies a positive voltage to the grids 102 and 103 of tubes 98 and 99, respectively. Due to the inherent unbalance of such systems either tube 98 or tube 99 will begin conducting first. Assuming tube 98 begins to conduct first, the positive side of condenser 111 will be connected through tube 98 to the cathode 105 of tube 99 and thus a potential will be impressed between the grid 103 and cathode 105 of tube 99, the potential on the grid being negative. Tube 99 is thereby prevented from conducting. The conduction of tube 98 will produce a firing impulse in the primary 25 of igniting transformer 21. Condenser 113 will also be charged when tube 98 is conducting, the charging current derived from battery 108 flowing from the positive side thereof through the primary 26 of igniting transformer 24, through choke coil 114 to condenser 113, and thence from the other side of condenser 113 through tube 98 to the negative side of the battery 108. The value of choke coil 114 is such as to prevent a peaked pulse of current which might cause ignition of tube 12 from appearing in the primary 26 of igniting transformer 24. Condenser 113 will be charged so that the side thereof towards anode 109 will be negative. Since condenser 111 is comparatively small it will discharge in a comparatively short time, but the value of condenser 111 which is selected is of such value that such condenser is not discharged before the pulse produced in the secondary 97 of transformer 96 has subsided. When the next pulse is produced in the secondary 97, tube 99 will fire. The firing of tube 99 will produce an igniting impulse in the primary 26 of igniting transformer 24 and at the same time will apply the charge of condenser 113 between the anode 109 and the cathode 104 of tube 98 and tube 98 will go out. When tube 98 stops conducting the flux in the core of transformer 21 will collapse and the current produced thereby will flow through rectifier 115 which has a comparatively low resistance. Thus the flux will collapse without producing a substantial voltage in the secondary of the transformer 21. When tube 98 goes out condenser 111 again becomes charged while condenser 112 is discharged through tube 99. As tube 99 conducts, condenser 113 is charged by battery 108 through primary 25 and through tube 99, the side of condenser 113 towards anode 110 of tube 99 becoming negative. When the next pulse of current flows in secondary 97 of transformer 96, tube 98 will fire and the charge on condenser 113 will be thereby impressed on tube 99 between its anode 112 and its cathode 105. Thereupon tube 99 will go out.

From the foregoing it will be seen that each succeeding pulse in the secondary 97 of transformer 96 alternately fires tubes 98 and 99, thereby alternately providing igniting impulses to the primaries 25 and 26 of igniting transformers 21 and 24. The firing system hereinbefore described is capable of extremely high speed operation.

While I have described the details of two embodiments of my invention it will be apparent that numerous changes might be made without departing from the teachings thereof. For example, I have shown a system for discharging one condenser into a welding load. It will be apparent that instead of a welding load the condenser may be adapted to discharge into any inductance. Numerous other changes will, of course, readily suggest themselves to those versed in the art and it is accordingly desired that the appended claims be given a broad interpretation commensurate with the scope of this invention within the art.

What is claimed is:

1. In an electrical control system for controlling the flow of current through a pair of circuits, a source of electrical energy impulses, said source including a control tube having a plurality of control electrodes adapted to control the flow of current therethrough in response to a plurality of operating conditions of said controlled circuits, a pair of electrical space discharge tubes each having a cathode, an anode, and a grid, means for coupling each of said cathodes to one terminal of said source, means for coupling each of said grids to the opposite terminal of said source, a condenser, means connecting one pole of said condenser to one of said anodes, means connecting the opposite pole of said condenser to the other of said anodes, a pair of loads each connected in series with one of said tubes, and separate means coupling the anode of each tube to the grid of the other tube.

2. In an electrical control system for controlling the flow of current through a pair of circuits, a source of electrical energy impulses, said source including a control tube having a plurality of control electrodes adapted to control the flow of current therethrough in response to a plurality of operating conditions of said controlled circuits, a pair of electrical space discharge tubes each having a cathode, an anode, and a grid, means for coupling each of said cathodes to one terminal of said source, means for coupling each of said grids to the opposite terminal of said source, a condenser, means connecting one pole of said condenser to one of said anodes, means connecting the opposite pole of said condenser to the other of said anodes, a pair of loads each connected in series with one of said tubes, and separate means coupling the anode of each tube to the grid of the other tube, each of said coupling means including a condenser.

3. In an electrical control system a pair of space discharge tubes each having a cathode, an anode, and a grid, a source of potential having a high voltage terminal connected to each of said anodes and a low voltage terminal connected to each of said cathodes, a pair of loads each in series between one of said tubes and said source of potential, a source of energy impulses having one terminal connected to each of said cathodes and an opposite terminal connected to each of said grids, a condenser having one pole connected to one of said anodes and the opposite pole connected to the other of said anodes, a pair of cross-connections each connecting the anode of one of said tubes to the grid of the other of said tubes and a condenser in each of said cross-connections.

4. In an electrical control system a pair of loads, a source of current, a circuit for supplying electrical energy impulses from said source alternately to each of said loads, a pair of electrical space discharge tubes in said circuit, each associated with one of said loads and adapted upon conduction thereof to connect its corresponding load to said source, each of said tubes having an anode, a cathode, and control means for controlling conduction thereof, means for producing intermittent electrical energy impulses independently of the conduction of said tubes, said last named means being connected to both of said control means to supply energy impulses simultaneously to said control means, and a condenser adapted to be charged in opposite vectorial directions by the conduction of said tubes, the conduction of either of said tubes impressing the charge of said condenser on the anode and cathode of the other tube in a direction to stop conduction of said other tube, and upon further conduction charging said condenser in the opposite vectorial direction.

5. In an electrical system for firing controlled ignition discharge tubes, a pair of igniting transformers, a source of current, a circuit for supplying electrical energy impulses from said source alternately to each of said igniting transformers, a pair of electrical space discharge tubes in said circuit, each in series with one of said igniting transformers and adapted upon conduction thereof to connect its corresponding igniting transformers to said source, each of said tubes having an anode, a cathode, and control means for controlling conduction thereof, means for producing intermittent electrical energy impulses independently of the conduction of said tubes, said last named means being connected to both of said control means to supply energy impulses simultaneously to said control means, and a condenser adapted to be charged in opposite vectorial directions by the conduction of said tubes, the conduction of either of said tubes impressing the charge of said condenser on the anode and cathode of the other tube in a direction to stop conduction of said other tube, and upon further conduction charging said condenser in the opposite vectorial direction.

6. In an electrical control system a pair of loads, a source of current, a circuit for supplying electrical energy impulses from said source alternately to each of said loads, a pair of electrical space discharge tubes in said circuit, each associated with one of said loads and adapted upon conduction thereof to connect its corresponding load to said source, each of said tubes having an anode, a cathode, and control means for controlling conduction thereof, means for producing intermittent electrical energy impulses independently of the conduction of said tubes, said last named means being connected to both of said control means to supply energy impulses simultaneously to said control means, and means effective upon conduction of one of said tubes for preventing conduction of the other of said tubes for a predetermined time interval.

HANS KLEMPERER.